US012042721B2

(12) United States Patent
Usman et al.

(10) Patent No.: US 12,042,721 B2
(45) Date of Patent: Jul. 23, 2024

(54) ELECTRONIC GAMING SYSTEM

(71) Applicant: Midwest Immersive, LLC, Chicago, IL (US)

(72) Inventors: Aaqib Usman, Chicago, IL (US); Kyle Granat, Mesa, AZ (US); Ben Hencke, Vancouver, WA (US); Robert Graham Plank, III, Park Ridge, IL (US); Elliot Kahn, New York, NY (US)

(73) Assignee: MIDWEST IMMERSIVE, LLC, Chicago, IL (US)

( * ) Notice: Subject to any disclaimer, the term of this patent is extended or adjusted under 35 U.S.C. 154(b) by 224 days.

(21) Appl. No.: 17/842,306

(22) Filed: Jun. 16, 2022

(65) Prior Publication Data

US 2022/0401827 A1 Dec. 22, 2022

Related U.S. Application Data

(60) Provisional application No. 63/211,210, filed on Jun. 16, 2021.

(51) Int. Cl.
*A63F 13/24* (2014.01)
*A63F 13/211* (2014.01)
(Continued)

(52) U.S. Cl.
CPC ............ *A63F 13/24* (2014.09); *A63F 13/211* (2014.09); *A63F 13/215* (2014.09);
(Continued)

(58) Field of Classification Search
None
See application file for complete search history.

(56) References Cited

U.S. PATENT DOCUMENTS 7,202,613 B2   4/2007  Morgan et al.
7,620,279 B2 * 11/2009  Joseph ................. G02B 6/001
                                                        385/125
(Continued)

FOREIGN PATENT DOCUMENTS

WO         2019202580 A1    10/2019

OTHER PUBLICATIONS

The International Search Report and The Written Opinion of The International Searching Authority, or The Declaration to corresponding PCT Application No. PCT/US2022/033807, Date of Mailing Dec. 15, 2022, 11 pages.
(Continued)

*Primary Examiner* — Jason T Yen
(74) *Attorney, Agent, or Firm* — TUCKER ELLIS LLP

(57) ABSTRACT

An electronic gaming console includes a first control device including a first button, a second control device including a second button, a tube connecting the first control device to the second control device, the tube comprising a plurality of lights within an interior of the tube, a memory; and a controller. The controller can be configured to receive one or more sets of instructions from a user device, store the sets of instructions in the memory, receive a first input from the first button and a second input from the second button; and control illumination of the plurality of lights based on at least one of the sets of instructions, and at least one of the first input or the second input.

20 Claims, 8 Drawing Sheets

(51) Int. Cl.
   *A63F 13/215* (2014.01)
   *A63F 13/428* (2014.01)
   *H05B 45/10* (2020.01)
   *H05B 45/20* (2020.01)
   *H05B 47/155* (2020.01)

(52) U.S. Cl.
   CPC ........... *A63F 13/428* (2014.09); *H05B 45/10* (2020.01); *H05B 45/20* (2020.01); *H05B 47/155* (2020.01); *A63F 2300/1043* (2013.01)

(56) References Cited

U.S. PATENT DOCUMENTS

| | | | |
|---|---|---|---|
| 9,119,264 B2 | 8/2015 | Pulido, Jr. | |
| 2004/0058733 A1 | 3/2004 | Hussaini et al. | |
| 2004/0090416 A1* | 5/2004 | Biheller ................. | A63F 13/22 345/156 |
| 2004/0166932 A1 | 8/2004 | Lam et al. | |
| 2006/0281561 A1* | 12/2006 | Tetterington .......... | A63F 13/837 463/51 |

OTHER PUBLICATIONS

Szczys, Mike, "LED Strip Pong as an Arduino Shield", Hackaday, (2013), [retrieved online Jun. 2022] <https://hackaday.com/2013/07/06/led-strip-pong-as-an-arduino-shield/#more-99617>, 8 pages.

"We made the 1D Pong Game by Great Scott Lab", Whadda Exciting Electronics, (2019), [retrieved online Jun. 2022] <https://whadda.com/we-made-the-1d-pong-game-by-greatscottlab/>, 5 pages.

Fixes, Chip, "LED Pong", Instructables Circuits, [retrieved online Jun. 2022] <https://www.instructables.com/LED-Pong/>, 31 pages.

"1D Pong, Yet another one, but a nice one", Vagrearg, (2015), [retrieved online Jun. 2022] <https://www.vagrearg.org/content/onedpong>, 4 pages.

"1D-Pong, Fun and simple game on a NeoPixel strip", Project Hub, (2020), [retrieved online Jun. 2022] <https/www.create.arduino.cc/projecthub/flyingangel/1d-pong-85e965>, 22 pages.

Matos, Clinton, "Pong too complicated? Use an Arduino to make a 1D version", hypertext, (2018), [retrieved online Jun. 2022] <https://htxt.co.za/2018/06/pong-too-complicated-use-an-arduino-to-make-a-1d-version/>, 1 page.

Patchy Projects, Facebook, [retrieved online Jun. 2022] <https://www.facebook.com/patchyprojects/photos/excited-for-the-official-debut-of-light-pong-this-1-d-multiplayer-action-game-wi/1063339117059462>, 1 page.

Patchy Projects, Instagram, [retrieved online Jun. 2022], <https://www.instagram.com/p/BtCaGYAnNtL/>, 2 pages.

Hall, Chris, "Light Pong (LED Game)—First Prototype", Patchy Projects, Youtube.com, (2016), [retrieved online Jun. 2022], <https://www.youtube.com/watch?v=pgRBMS_9I8Q>, 2 pages.

Sowa, Schuyler, "LED Pong", Youtube.com, (2014), [retrieved online Jun. 2022], <https://www.youtube.com/watch?v=LxQZTNKggJY>, 5 pages.

* cited by examiner

ELECTRONIC GAMING SYSTEM

CROSS-REFERENCE TO RELATED APPLICATIONS

This application claims priority to and the benefit of U.S. application Ser. No. 63/211,210 filed on Jun. 16, 2021, the entirety of which is incorporated herein by reference.

TECHNICAL FIELD

In general, the present invention relates to an electronic console that can be programmed to operate a variety of display modes and games.

BACKGROUND OF THE INVENTION

Video games have increased in popularity over the years. A unique and portable video game console may be beneficial.

SUMMARY OF THE INVENTION

In accordance with an embodiment of the present invention, an electronic gaming console is provided including: a first control device including a first button, a second control device including a second button, a tube connecting the first control device to the second control device, the tube comprising a plurality of lights within an interior of the tube, a memory and a controller. The controller can be configured to receive a set of instructions from a user device, store the set of instructions in the memory, receive a first input from the first button and a second input from the second button, and control illumination of the plurality of lights based on the set of instructions, and/or at least one of the first input or the second input.

These and other objects of this invention will be evident when viewed in light of the drawings, detailed description and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

DETAILED DESCRIPTION OF THE INVENTION

Embodiments of the invention relate to an electronic gaming console. An embodiment of the electronic gaming console includes a first control device and a second control device physically connected to one another by a tube that includes a plurality of lights. The plurality of lights extend along the length of the tube, along a single dimension. The electronic gaming console can operate in a variety of modes such as a display mode or a game mode. While in the display mode, the electronic gaming console can illuminate the plurality of lights according to a pattern. While in the game mode, one or more users may interact with the first and/or second control device to control illumination of the plurality of lights within the tube based on a set of instructions stored on the electronic gaming console. A further aspect of the electronic gaming console involves the electronic gaming console receiving one or more sets of instructions from a user device. A user may download sets of instructions (e.g. computer programs) from a third party source such as an application marketplace available over the internet. A user may also use a code development environment to create custom sets of instructions that can be transmitted to and received by the electronic gaming console.

The best mode for carrying out the invention will now be described for the purposes of illustrating the best mode known to the applicant at the time of the filing of this patent application. The examples and figures are illustrative only and not meant to limit the invention, which is measured by the scope and spirit of the claims.

Figure 1:
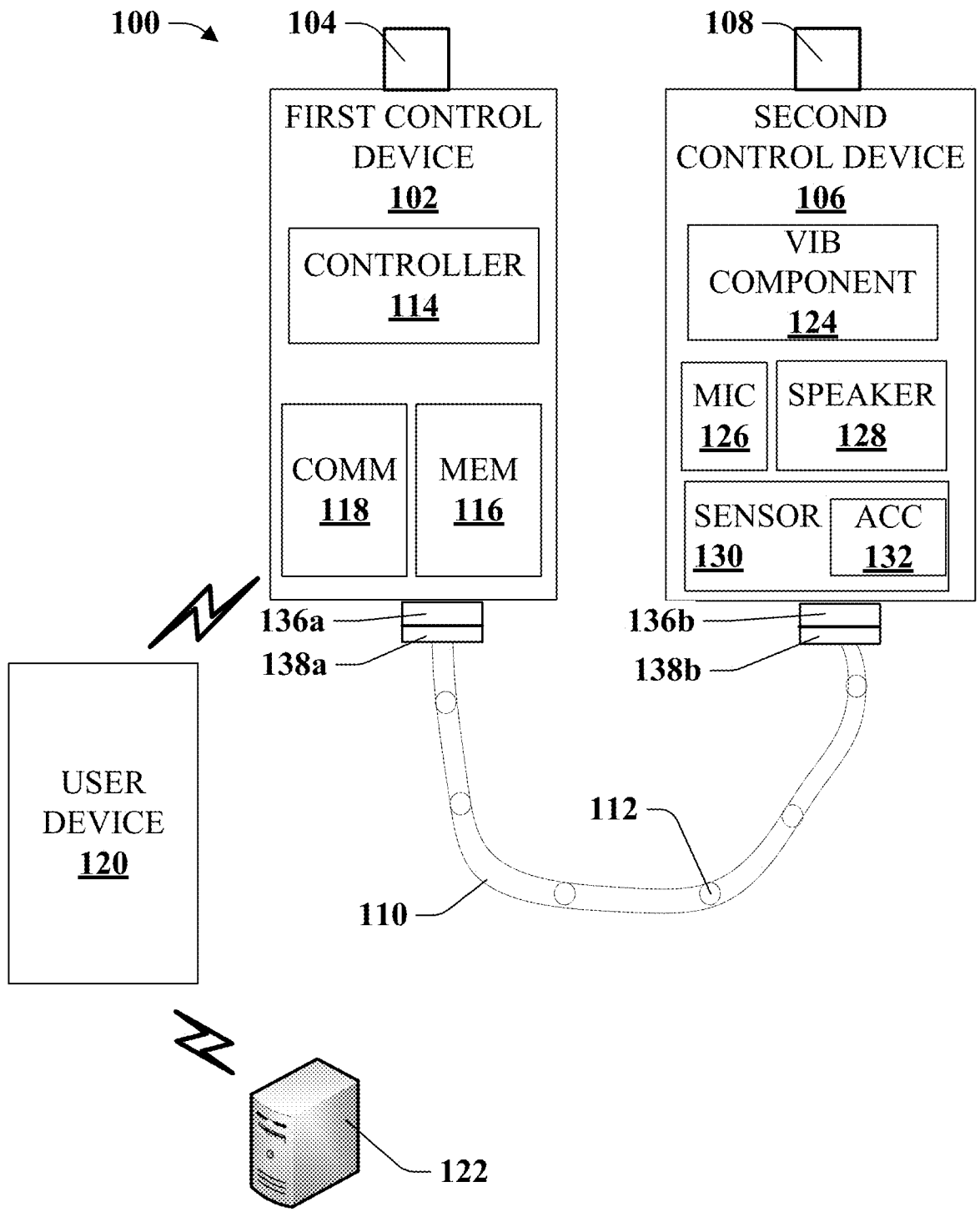
FIG. 1 is a schematic view of an exemplary electronic gaming console.

Referring now to the drawings, wherein the drawings are for the purpose of illustrating an exemplary embodiment of the invention only and not for the purpose of limiting same, FIG. 1 illustrates an example of a schematic embodiment of an electronic gaming console 100. The electronic gaming console 100 can include a first control device 102 having a first button 104 and a second control device 106 having a second button 108. The first control device 102 and the second control device 106 can be any type of device that allows a user to interact with the electronic gaming console 100. By way of example and not limitation, the first control device 102 and the second control device 106 can be a handle, a joystick, a gaming controller, or a wearable device such as a glove, among others. In one embodiment, the first control device 102 and the second control device 106 are handles that include respectively, first and second buttons 104, 108. The first button 104 and the second button 108 can be any type of input component. It should be appreciated that the first control device 102 and the second control device 106 can each include a plurality of buttons. By way of example and not limitation, the first button 104 and the second button 108 can be a physical button, a touch-sensitive button, a trigger, or a switch, among others. The first button 104 and the second button 108 can include one or more lights so that the buttons may illuminate. It should be appreciated that the electronic gaming console 100 can be a portable device and can include a rechargeable battery. The electronic gaming console 100 may also include a power switch for power the device on and off.

The first control device 102 and the second control device 106 are physically connected to one another by a tube 110. The tube 110 includes a plurality of lights 112 located within the tube 110 and arranged along the length of the tube 110, with the plurality of lights 112 arranged in a single dimension. The tube 110 can be constructed of transparent or translucent material such that the plurality of lights 112 may be at least partially visible through the tube 110 when illuminated. In certain embodiments, the tube 110 is constructed from plastic or silicone (e.g. a silica gel tube). In certain embodiments, the tube 110 may be one to several feet long. In one particular embodiment, the tube 110 is 1.5 meters long. However, it should be appreciated that the tube 110 may be any length. The plurality of lights 112 can be arranged along the length of the tube 110 close enough together that illuminating each successive individual light creates the effect of a continuous line of lights throughout the tube 110. The density of lights can be selected using sound engineering judgment and may be selected to achieve a variety of effects. In certain embodiments, the density of lights can be between 30 lights per meter and 144 lights per meter. At the low end of that range, 30 lights per meter provides a longer battery life, but a lower resolution, which may cause a choppier simulation of movement of light along the tube 110. On the high end of the density range, 144 lights per meter provides a higher resolution and smoother movement simulation of light along the tube 110, but a shorter battery life due to the extra power requirements. In one embodiment, the plurality of lights 112 are arranged at a density of 100 lights per meter. In certain embodiments, the plurality of lights 112 can include light-emitting diodes (LED) and can be any color. In certain embodiments, the plurality of lights 112 include multi-color LED lights. In other embodiments, the plurality of lights 112 can also include a liquid crystal display (e.g. a flexible liquid crystal display), incandescent bulbs, halogen bulbs, florescent bulbs, or any other electronically driven display.

The first control device 102 and the second control device 106 can be detachable from the tube 110, and therefore, detachable from the electronic gaming console 100. The detachability of the first control device 102 and the second control device 106 can allow a user to easily replace the control device in the event that the first control device 102 or the second control device 106 breaks or malfunctions. In certain embodiments, the electronic gaming console 100 can incorporate a variety of different types of control devices and a user can swap the first control device 102 and/or the second control device 106 with a different type of control device. For example, the electronic gaming console 100 can operate with and be controlled by a handle with buttons. Such control device is configured to be user-removable from the tube 110. A user may then connect a joystick, a motion control device, or any other type of control device to the gaming console 100 in place of the handle with buttons.

The first control device 102 and the second control device 106 can removably connect to the tube 110 respectively by way of a first connector component 136a, and a second connector component 136b. The first and second connector components 136a, 136b correspond respectively to a first tube connector component 138a and a second tube connector component 138b, which can both mechanically and electrically couple with the first and second connector components 136a, 136b. The first connector component 136a and the second connector component 136b can each include a physical connecting component such as a snap lock such as the connector on an XLR cable connector, a threaded connector, a twist and lock connector, among others. The first and second tube connector components 138a, 138b are configured to mechanically correspond to the physical connecting component of the first and second connector component 136a, 136b. The first connector component 136a and the second connector component 136b can each also include an electrical connecting component such as wired pin connectors. Similarly, the first and second tube connector components 138a, 138b are configured to electrically correspond to the electrical connecting component of the first and second connector component 136a, 136b. For example in an embodiment where the connector component 136a, 136b includes male electrical pins, the corresponding tube connector component 138a, 138b can include female electrical pin receptacles. In another embodiment, the connector component 136a, 136b includes female electrical pin receptacles and the tube connector component 138a, 138b includes male electrical pins.

The electronic gaming console 100 can include a controller 114. The controller 114 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. The controller 114 may be a microprocessor, but in the alternative, the controller 114 may be any processor, controller, microcontroller, or state machine. The controller 114 may also be implemented as a combination of computing devices, for example a combination of a DSP and a microprocessor, a plurality of microprocessors, multi-core processors, one or more microprocessors in conjunction with a DSP core, or any other such configuration. In one embodiment, the controller 114 can include a first controller component and a second controller component that can be distributed among the first control device 102 and the second control device 106. In this embodiment, the first controller component and the second controller component can operate in a "master/slave" format.

The electronic gaming console 100 can further include a memory 116. The memory 116 can include volatile and nonvolatile, removable and non-removable media implemented in any method or technology for storage of information such as computer-readable instructions, data structures, program modules, or other data. The memory 116 may include, but is not limited to memory devices (e.g., random access memory (RAM), read-only memory (ROM), electrically erasable programmable read-only memory (EEPROM)), magnetic storage devices (e.g., hard disk, floppy disk, cassettes, tape), optical disks (e.g., compact disk (CD), digital versatile disk (DVD)), and solid state devices (e.g., solid state drive (SSD), flash memory drive (e.g., card, stick, key drive)), or any other medium which can be used to store the desired information and which can be accessed by the controller 114.

The electronic gaming console 100 can further include a communication interface 118. The communication interface 118 can enable electronic communications between the electronic gaming console 100 and another device such as a user device 120 or one or more third party servers 122 accessible via the internet. It is to be appreciated that the communication interface 118 can be a wired or wireless interface including, but not limited to, a LAN cable, an Ethernet cable, a USB interface, a serial interface, a WiFi interface, a short-range RF interface (e.g. Bluetooth), an infrared interface, a near-field communication (NFC) interface, etc.

With reference to FIG. 1, while the controller 114, the memory 116, and the communication interface 118 are shown as being included as part of the first control device 102, it should be appreciated that these components may be included elsewhere such as part of the second control device 106, or even externally to the first control device 102 and second control device 106.

The electronic gaming console 100 can further include a vibration component 124. The vibration component 124 can be located within one or both of the first control device 102 and the second control device 106. The vibration component 124 can be configured to vibrate within the first control device 102 and/or the second control device 106 to independently provide haptic feedback to a user holding the first or second control device 102, 106. Further, the electronic gaming console 100 can include a microphone 126 located in one or both of the first control device 102 and the second control device 106. The microphone 124 can be configured to receive audio inputs and allows for audio-reactive functionality such as voice controls of the electronic gaming console 100 or sound synchronization of the plurality of lights 112. Still further, the electronic gaming console 100 can include one or more speakers 128 located in one or both of the first control device 102 and the second control device 106. One or more sensors 130 can also be incorporated into the electronic gaming console 100. By way of example and not limitation, sensors 130 can include one or more accelerometers, gyroscopes, pressure sensors, position sensors, among others, located in one or both of the first control device 102 and the second control device 106. In one embodiment, at least one of the first control device 102 and the second control device 106 can include an accelerometer 132. The accelerometer 132 can provide motion feedback to the controller 114. In this embodiment, the controller 114 can be configured to control the plurality of lights 112 based on inputs from the accelerometer 132. In one example, a user can interact with the plurality of lights 112 by moving or swinging the first or second control device 102, 106. In this example, the user can control the electronic gaming console 100 to simulate "bouncing" the moving lights in the plurality of lights 112 by swinging, moving, or shaking the first or second control device 102, 106. The accelerometer 132 can detect such movement and provide signals to the controller 114 that represent the movement.

With reference to FIG. 1, while the vibration component 124, the microphone 126, the speaker 128, and the sensors 130 are shown as being included as part of the second control device 106, it should be appreciated that these components may be included elsewhere such as part of the first control device 102, part of both the first control device 102 and the second control device 106, the tube 110, or even externally to the first control device 102, second control device 106, and tube 110.

In one embodiment the electronic gaming console 100 can receive a set of instructions such as computer code from a user device 120 through wireless communications such as Bluetooth or WiFi, or wired communications such as universal serial bus (USB). By way of example and not limitation, user device 120 can be a computer or a mobile device such as a smartphone. The set of instructions can be stored in the memory 116 where it is accessible by the controller 114. It should be appreciated that the memory 116 can store one set of instructions or multiple sets of instructions. In certain embodiments, a set of instructions may be received by the electronic gaming console 100 by way of inserting a cartridge or a disk (e.g. an SD card) into the electronic gaming console 100, or via download through the internet.

The controller 114 can be configured to receive a mode input indicative of an operating mode. The operating mode can indicate a display mode or a game mode. While in the display mode, the controller is configured to control illumination of the plurality of lights 112 according to a pattern. The pattern can either be a pre-defined pattern, or it could be a pattern that is generated in real-time according to a mathematical algorithm. Such a pre-defined pattern or an algorithm controlling the generation of the pattern can be modified by additional inputs including a button input, a motion input (e.g. an input from an accelerometer), a sound input (e.g. an input by a microphone), among others. The pattern can include illuminating the plurality of lights 112 in a particular sequence, or changing the colors or brightness of the plurality of lights 112, or both. In one example, the pattern includes an illumination sequence that simulates movement within the tube 110. The electronic gaming device 100 may be used, for example, for decorative purposes or to create a particular ambience while in display mode. In certain embodiments, during the display mode, the controller 114 can control illumination of the plurality of lights 112 based on audio received as an input via the microphone 126. For example, the controller 114 can illuminate the plurality of lights 112 in a manner that is synchronized with music or other sound received via the microphone 126. In various embodiments, a user can configure the electronic gaming device 100 to display certain patterns or colors by way of the user device 120. In one embodiment, a user can communicate settings or instructions pertaining to the display of the plurality of lights 112 to the electronic gaming console 100 via a wireless connection (e.g. Bluetooth) with the communication interface 118. The user can pre-program the pattern or can control the pattern on demand using the user device 120.

While in the game mode, the controller 114 is configured to control illumination of the plurality of lights 112 based on the set of instructions and user interactions with at least one of the first control device 102 and the second control device 106. One or more users may provide inputs to the electronic gaming console via the first button 104 and the second button 108. By pressing the first button 104 or the second button 108, a user may interact with the plurality of lights 112. It should be appreciated that the first control device 102 and/or the second control device 106 can include multiple buttons, as described with respect to FIGS. 2A-2D. The one or more users may also interact with the electronic gaming console 100 by providing audio or voice inputs via the microphone 126, and/or providing motion activated inputs via the sensors 130. In one embodiment, the sensors 130 (e.g., accelerometer and/or gyroscope) can detect motion of the first control device 102 and/or the second control device 106. The detected motion can be used as an input to interact with the electronic gaming console 100 to control the illumination of the plurality of lights 112. In certain embodiments, a user may also interact with the plurality of lights by way of the user device 120 that is paired or otherwise in communication with the electronic gaming console 120. In still further embodiments, the electronic gaming console 100 can connect to peripheral devices to expand its functionality. Peripheral devices can include a foot controller including a foot button, an additional game control device, a wearable peripheral such as a glove, a boot, or a headset, among others. The peripheral devices can be connected to the electronic gaming console 100 by way of a wired or a wireless connection, and can be used to allow the user to further interact with the electronic gaming console 100 such as by controlling the illumination of the plurality of lights 112.

In one embodiment, the electronic gaming console 100 can be used as a wireless controller to control other devices such as another gaming console or a virtual reality headset. In one example, a user can wear a virtual reality headset and use any combination of the first button 104, the second button 108, and/or the sensors 130 (e.g. the accelerometer and/or the gyroscope) to control aspects of a program being executed and displayed by the virtual reality headset. While the electronic gaming console 100 is being utilized as a wireless controller for another gaming console or virtual reality headset, it should be appreciated that the controller 114 may control illumination of the plurality of lights 112 for decorative or visual effect purposes. In certain embodiments, the controller 114 can control illumination of the plurality of lights 112 in coordination with or based on interactions taking place within the program being executed and displayed by the other gaming console or the virtual reality headset.

In still further embodiments, the electronic gaming console 100 can connect with one or more additional electronic gaming consoles 100 via a wired or wireless connection. A user of the electronic gaming console 100 can at least partially control illumination of the plurality of lights 112 on the one or more additional electronic gaming consoles 100 and vice versa. Accordingly, the electronic gaming console 100 can connect to one or more additional electronic gaming consoles 100 to operate and play multiplayer games including multiple electronic gaming consoles 100.

In one embodiment, the controller 114, according to a set of instructions stored in the memory 116, illuminates the plurality of lights 112 to provide the effect of light travelling from one end of the tube 110 to the other. While the travelling light approaches the first control device 102, a user can press the first button 104 to send the light travelling through the tube 110 in the opposite direction, towards the second control device 106. While the travelling light approaches the second control device 106, a user can similarly press the second button 108 to send the light travelling back through the tube 110. In this particular game represented by a set of instructions, this back and forth travelling of the light continues until one user fails to press the respective button 104, 108 before the light travels to their end of the tube 110. It should be appreciated that the controller 114 can illuminate the plurality of lights 112 in many different ways, including simulating the motion described above, and at different speeds, which can vary based on the timing of the press of a button 104, 108 with respect to the position of the travelling light within the tube 110.

The set of instructions may also provide for certain games or interactions that only incorporate inputs from a single user using only one of the first control device 102 or the second control device 106. When the controller 114 operates under such a set of instructions, the single user may interact with the electronic gaming console 100 to play a single player game. Certain single player games can utilize the controller 114 to simulate the actions of a second player operating the other control device 102, 106.

The electronic gaming console 100 can interact with one or more remote servers 122 to transmit or receive data. The electronic gaming console 100 can communicate with the one or more remote servers 122 directly via an internet connection (e.g. WiFi), or indirectly via the user device 120. In certain embodiments, the electronic gaming console 100 can transmit data to the one or more remote servers 122 including a user's score, high score, or statistics related to a particular game that is executed by the electronic gaming console based on a set of instructions. The user can access this data, along with the data of other users of other electronic gaming consoles 100, via the user device 120. For example, using the user device 120, the user can view their game statistics as well as the game statistics of other users for a particular game. The game statistics may take the form of a leaderboard.

The electronic gaming console 100 can receive and store a variety of sets of instructions. The controller 114 can operate the electronic gaming console 100 in a customizable fashion depending on the set of instructions that is currently being executed by the controller 114. In this manner, the electronic gaming console 100 can be customizable in its operation by a user, and may execute different sets of instructions to allow a user to use the electronic gaming console 100 to play a wide variety of games and/or display a variety of visual patterns. As described with regards to FIG. 5, a user may acquire a set of instructions or create a set of instructions, and transmit the set of instructions from the user device 120 to the electronic gaming console 100 to be stored in the memory 116 and executed by the controller 114. In this fashion, the electronic gaming console 100 may be reprogrammable and user-programmable such that it may be used as a coding platform.

The user device 120 can be used to provide inputs and/or adjust settings for the electronic gaming console 100. For example, the user device 120 may provide an interface for a user to adjust communication settings, adjust volume settings, adjust vibration settings, and/or select display settings. The display settings can be adjusted manually from the user device (e.g. providing brightness control). In one embodiment, the user device 120 can provide a user with a plurality of pre-set device settings that include pre-determined settings for the electronic gaming console. For example, the pre-set device settings can include different experience modes that include individualized settings for one or more of volume settings, vibration settings, and display settings. A user can select a pre-set device setting on the user device 120, and the user device 120 can then wirelessly communicate the corresponding settings to the electronic gaming console 100.

Figure 2A:
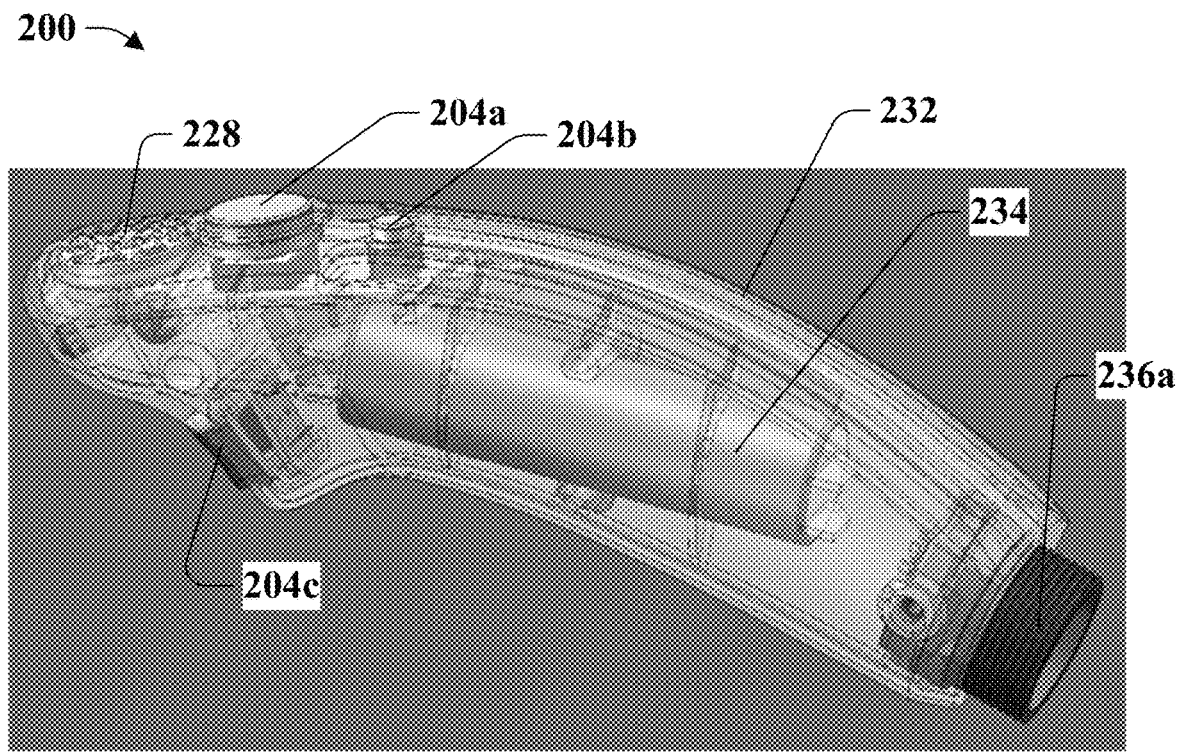
FIG. 2A is a perspective view of an exemplary control device.
Figure 2B:
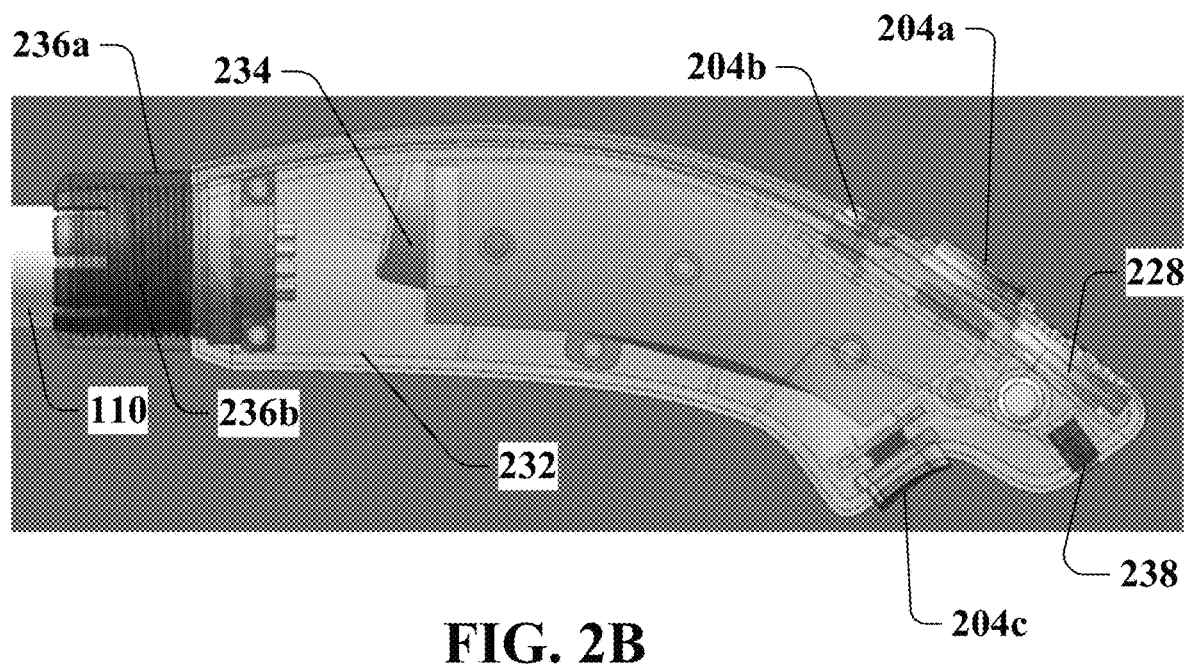
FIG. 2B is a side view of an exemplary control device.
Figure 2C:
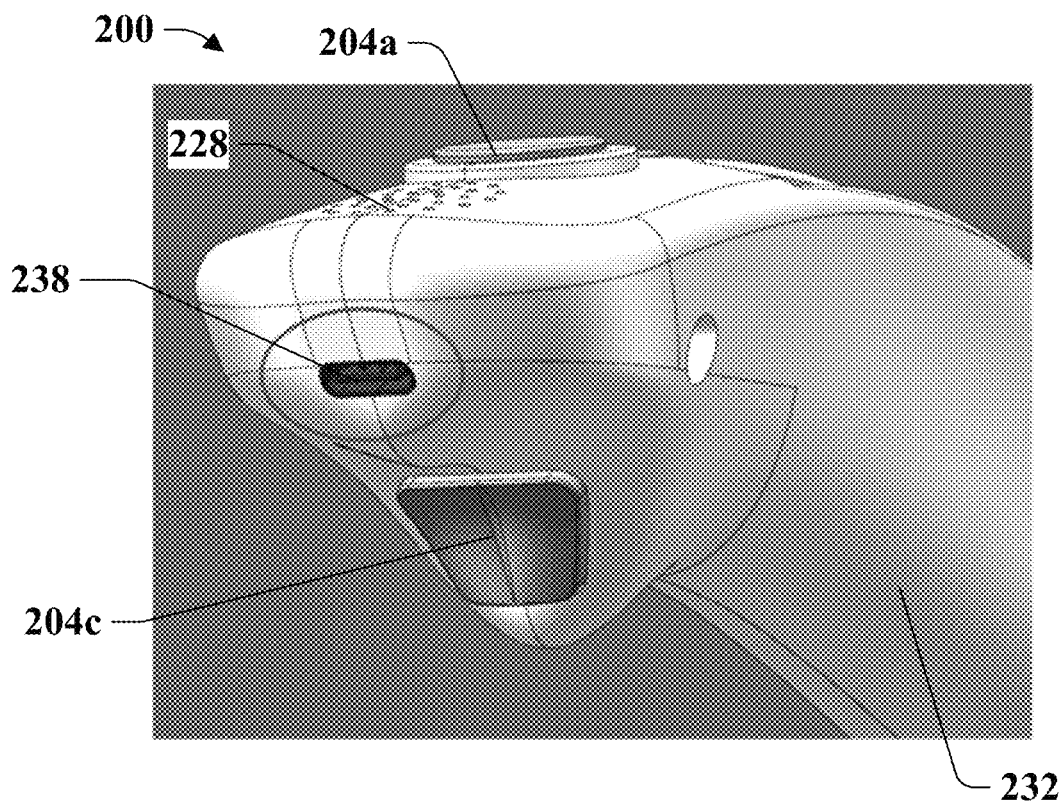
FIG. 2C is a front perspective view of an exemplary control device.
Figure 2D:
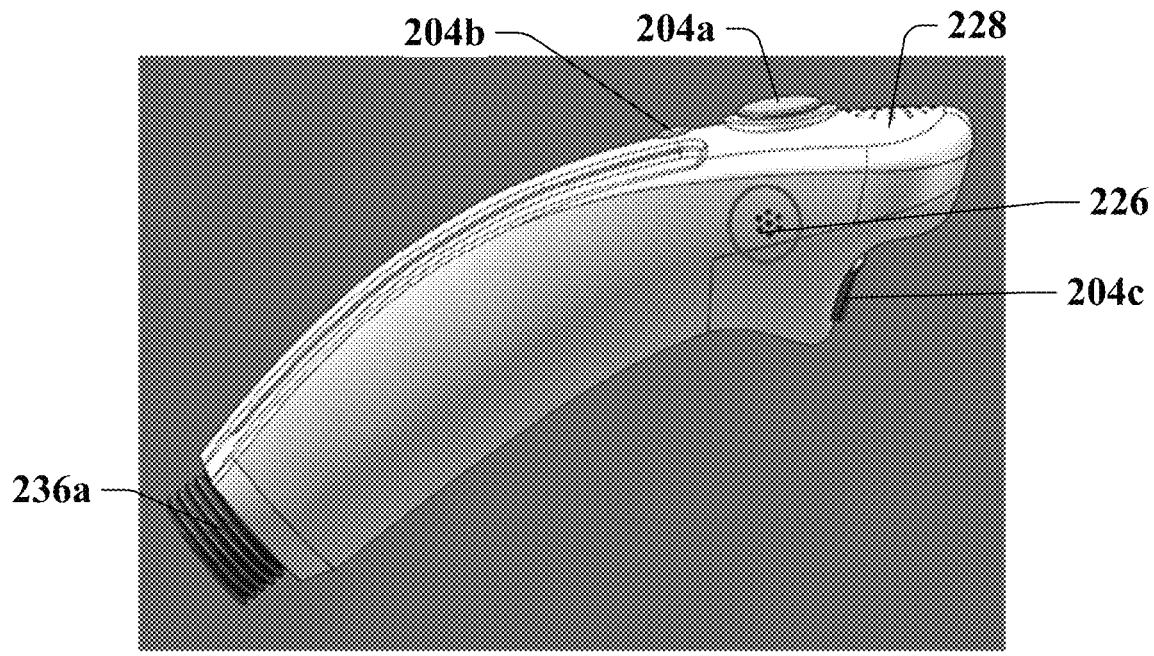
FIG. 2D is a side view of an exemplary control device.

Turning now to FIGS. 2A-2C, an exemplary control device 200 is shown. It should be appreciated that one or both of the first control device 102 and the second control device 106 can be a control device 200. Control device 200 is shaped as a handle, which allows a user to grasp the control device 200 with one hand. Control device 200 can include a plurality of buttons. For example, a primary button 204a and a secondary button 204b can be located on a top surface of the control device 200. The primary button 204a and the second button 204b are positioned such that a user can operate the buttons with the user's thumb while grasping the control device 200 as a handle. A trigger button 204c can be located on a front portion of the control device 200 in a position that allows for the user to depress the button like a trigger (e.g. with the user's index finger). The control device includes a speaker 228 for emitting sounds. The speaker 228 can include one or more holes in the casing 232 of the control device 200 to allow for the sound produced within the control device 200 to be emitted external to the control device 200 such that the user can hear the produced noise. The control device 200 can further include a microphone 226, which similarly includes one or more holes in the casing 232 to allow for sound external to the control device 200 to be received by the microphone 226 internal to the control device 200. The control device 200 further includes a battery 234. In certain embodiments, the battery 234 is a rechargeable battery electrically coupled to port 238. The port 238 can be, for example, a USB port, a micro USB port, or any other wired connection means. Port 238 can be utilized for charging the battery 234 from a power source such as a standard wall outlet or external battery bank, and can also be used for wired communications and programming of the electronic gaming console 100.

FIG. 2A depicts a first embodiment of the first connector component 236a on the control device 200, where the first connector component 236a includes a threaded connection configured to matingly engage with a second connector component 236b on one end of the tube 110. In this embodiment, the threading is on an exterior of the first connector component 236a, which corresponds to an internal threading on a corresponding second connector component 236b. It should be appreciated that the first connector component 236a can also include other various physical connection means such as a snap connection or a twist and lock connection. First connector component 236a provides a removable physical connection to the tube 110 as well as a removable electrical connection to the tube, which includes a corresponding second connector component 236b. FIG. 2B depicts a second embodiment of the connector components. The first connector component 236a on the control device 200 includes internal threading, which corresponds to an external threading on second connector component 236b.

Figure 3:
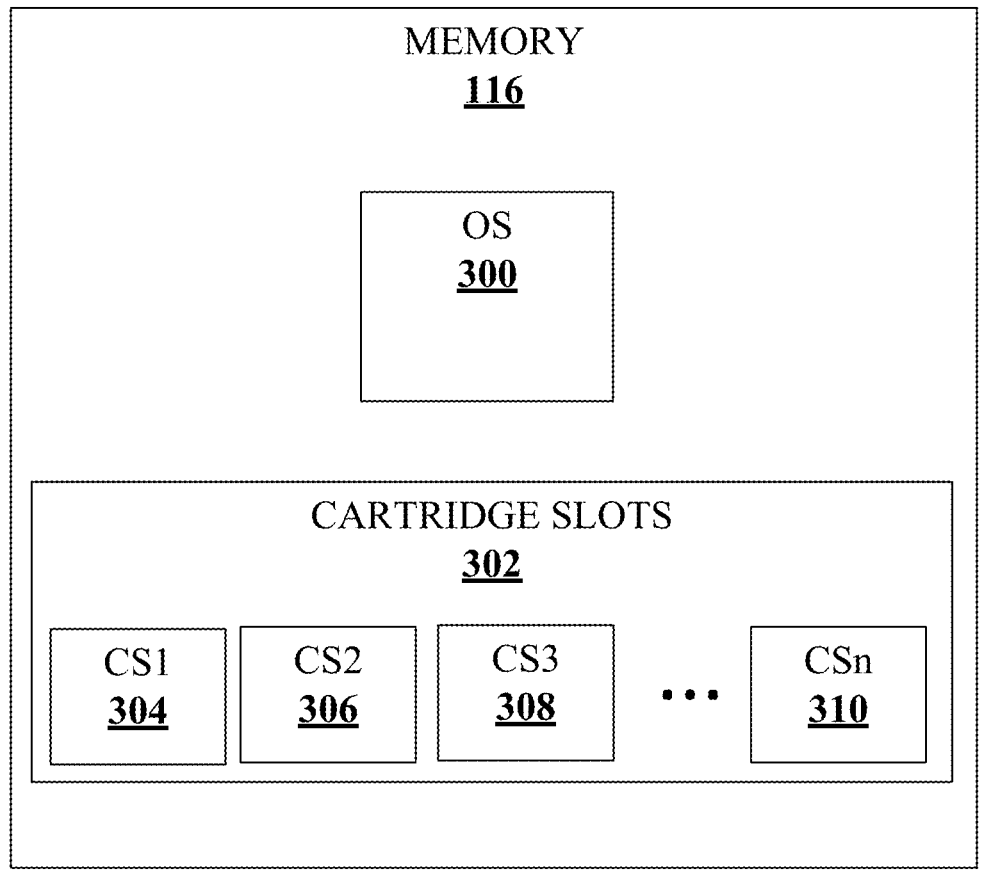
FIG. 3 is a schematic view of exemplary memory.

FIG. 3 depicts the memory 116 of the electronic gaming console 100. The memory 116 can include an operating system 300, which is a set of instructions accessible by the controller 114 to control the overall operation of the electronic gaming console 100, such as device settings, initial device setup, communications with the user device 120, and providing a user interface for programming the electronic gaming console 100, uploading sets of instructions, or selecting sets of instructions to operate on the electronic gaming console 100. The memory 116 can also include one or more cartridge slots 302, which are portions of the memory 116 used to store sets of instructions. In the embodiment of FIG. 3, there is a first cartridge slot 304 configured to store a first set of instructions, a second cartridge slot 306 configured to store a second set of instructions, and a third cartridge slot 308 to store a third set of instructions. Each set of instructions can be unique and can represent, for example, a game or and/or display instructions for a visualization mode. It should be appreciated that the memory 116 can include any number of cartridge slots 310. The user can utilize a companion application on the user device 120 to view the contents of each cartridge slot 310, and delete, swap, or replace the set of instructions in a particular cartridge slot 310 with a different set of instructions. It should be appreciated that the sets of instructions can be created by the user or downloaded and/or purchased via a digital marketplace.

In one embodiment, the electronic gaming console 100 can receive or download a set of instructions from a network such as the internet, based on a command from the user device 120. A user can navigate a listing of a plurality of sets of instructions (e.g. applications such as games or display instructions) using an application on the user device 120 and choose a set of instructions to install onto the electronic gaming console 100. In response to the user selecting a set of instructions, the user device 120 can send a command to the electronic gaming console 100 that instructs the electronic gaming console 100 to download and install the selected set of instructions from the network (e.g. from an online server located on the network such as the internet). Based on the command from the user device 120, the electronic gaming console 100 downloads and installs the selected set of instructions from the network. For example, the electronic gaming console 100 can communicate with the network via a wireless (e.g. WiFi) or wired internet connection. The electronic gaming console 100 can store the set of instructions in any of the cartridge slots 310, which may be selected by the user using the user device 120 and communicated as part of the command sent to the electronic gaming console 100. This process can be performed additional times to download and install additional sets of instructions to additional cartridge slots 310.

Figure 4:
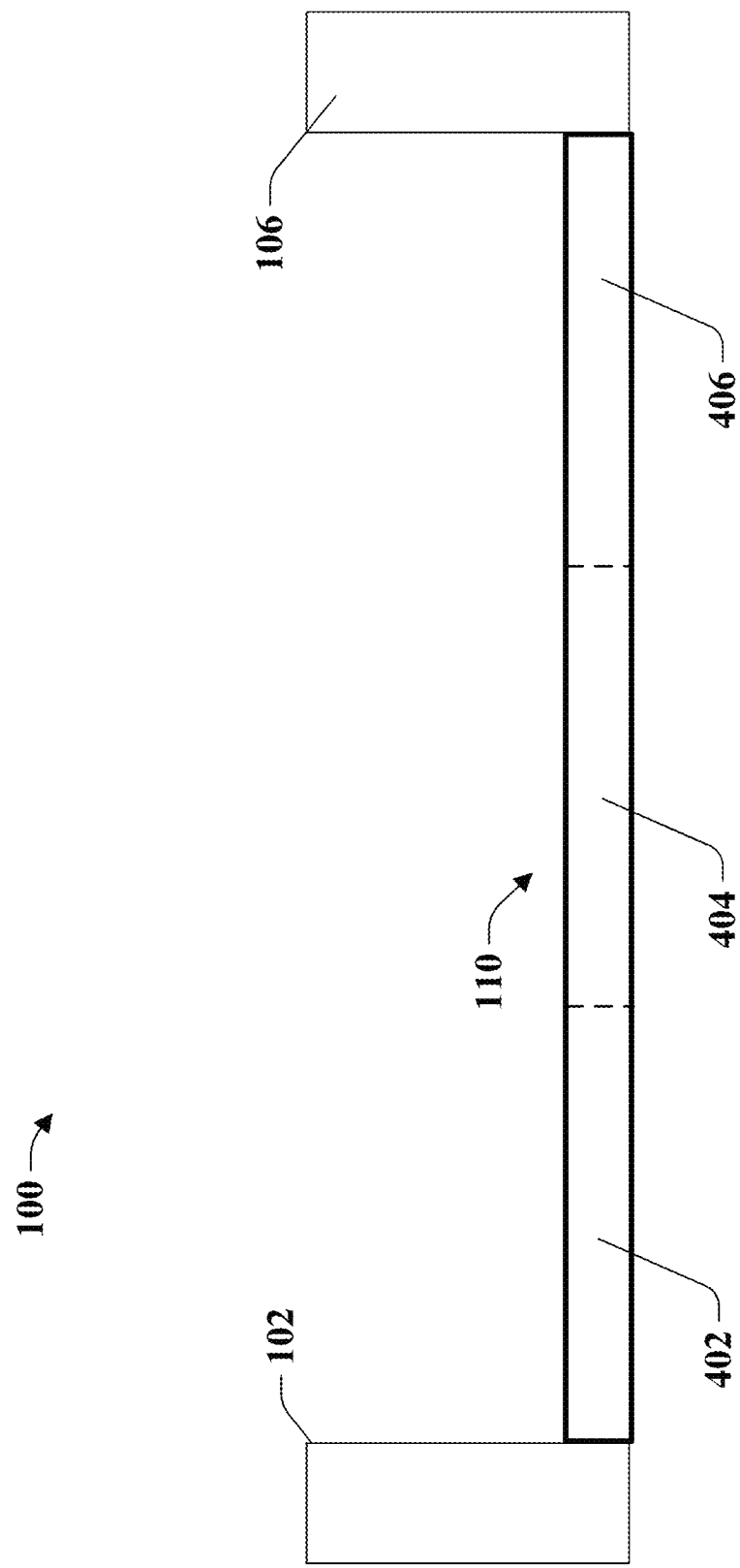
FIG. 4 is a schematic view of an exemplary electronic gaming console.

Turning now to FIG. 4, the operating system 300 can include instructions for providing a user interface using the electronic device 100 that allows the user to view the set of instructions stored in each cartridge slot 308 and select which set of instructions that the controller 114 executes. In one embodiment, the plurality of lights within the tube 110 are partitioned into a plurality of sections of lights, with each section of lights corresponding to a particular cartridge slot 310. In an embodiment that includes three cartridge slots, the tube 110 can include a first section of lights 402 corresponding to a first set of instructions stored in the first cartridge slot 304, a second section of lights 404 corresponding to the second set of instructions stored in the second cartridge slot 306, and a third section of lights 406 corresponding to the third set of instructions stored in the third cartridge slot 308. The controller 114 can be configured to independently control illumination of each of the sections of lights 402, 404, 406 according to the set of instructions stored in each section of light's corresponding cartridge slot. In one example, the first section of lights 402 displays an animation that represents a game stored in the first cartridge slot 304, the second section of lights 404 displays a different animation that represents another game stored in the second cartridge slot 306, and the third section of lights 406 displays a different animation that represents yet another game stored in the third cartridge slot 308.

A user can utilize the first control device 102 or the second control device 106 to provide an input selecting one of the sets of instructions stored in the cartridge slots 302 and represented by one of the sections of lights 402, 404, 406. In one embodiment, all sections of lights are illuminated simultaneously (e.g. all sections of lights are independently displaying their corresponding animations simultaneously). A user can highlight a particular section of lights by using an input on one of the control devices 102, 106 such as by using the one or more buttons 104, a voice control, a motion control, among others. In one example, a user can highlight a different section of lights by pressing the secondary button 204b. When a section of lights is highlighted, the highlighted section of lights can be illuminated brighter while the other non-highlighted sections are illuminated dimmer. The user can select the set of instructions corresponding to the highlighted section of lights for execution by the controller 114 by using another input of the first or second control device 102, 106. For example, the user can select the highlighted section of lights by pressing the primary button 204a, the trigger button 204c, or by using voice controls or motion controls.

In another embodiment, only the highlighted section of lights is illuminated while the non-highlighted sections of lights are not illuminated. For example, if the first section of lights 402 is highlighted by a user, the first section lights 402 is controlled according to the set of instructions in the first cartridge slot 304 (e.g. an animation is displayed corresponding to a game stored in the first cartridge slot 304), while the second section of lights 404, and the third section of lights 406 are not illuminated. When the user scrolls to the second section of lights using the control device 102, 106, the second section of lights 404 is controlled according to the set of instructions in the second cartridge slot 306 (e.g. an animation is displayed corresponding to a game stored in the second cartridge slot 306), while the first section of lights 402, and the third section of lights 406 are not illuminated. When the user provides an input selecting one of the first, second or third sets of instructions, the controller 114 is configured to control illumination of the plurality of lights 112 based on the selected set of instructions. In other words, the visual partitions of the sections of lights 402, 404, 406 disappear and the controller 114 controls the plurality of lights 112 according to the selected set of instructions along the full length of the tube 110.

Figure 5:
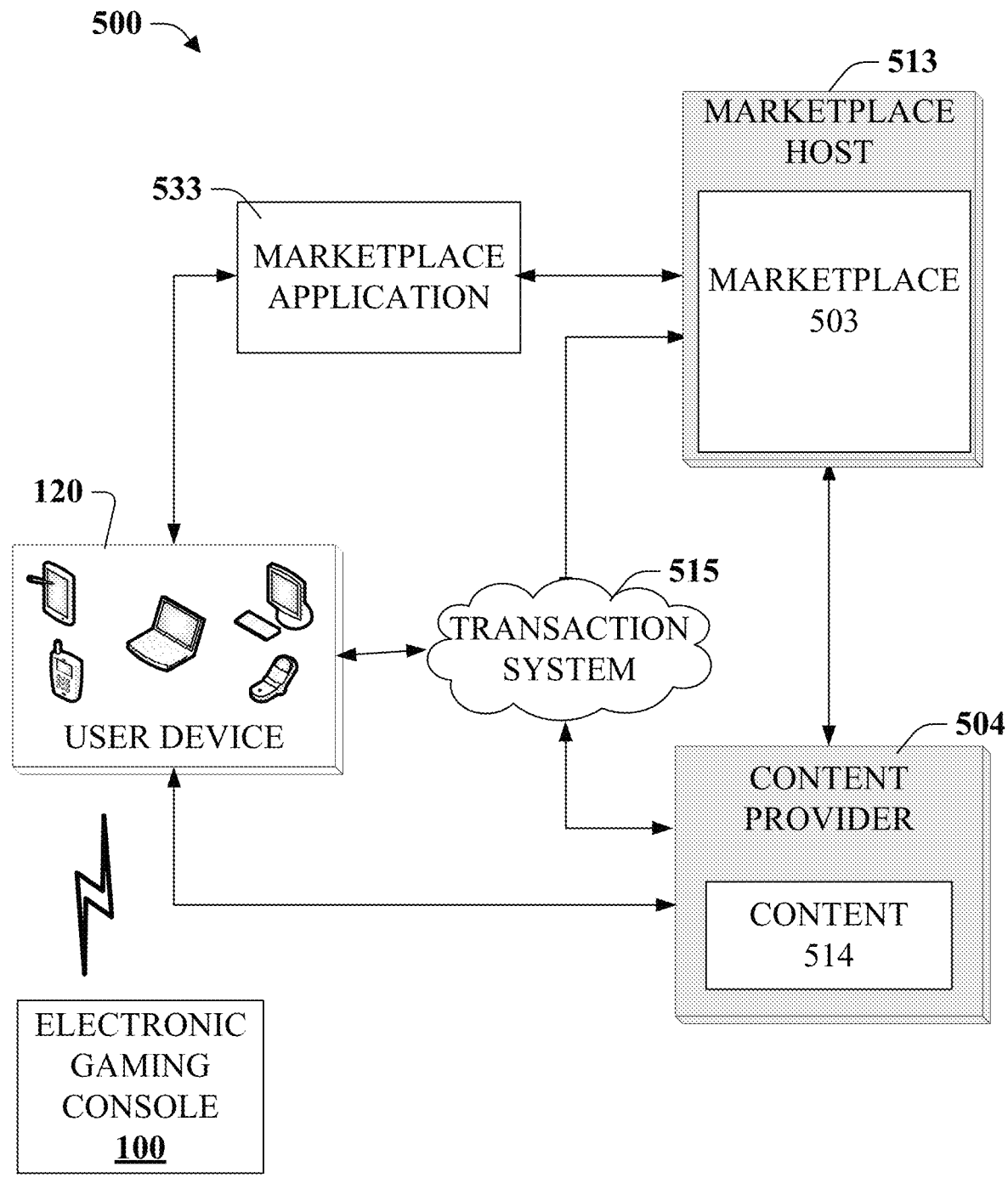
FIG. 5 is a is a schematic block diagram illustrating a suitable environment for delivery of data in accordance with the subject disclosure.

FIG. 5 illustrates an operating environment 500 that can be used with the subject innovation and in particular, the electronic gaming console 100 and user device 120, and depicts various options for the creation and/or acquisition of sets of instructions. The operating environment 500 includes a user device 120 (e.g., device smartphone, a tablet, a laptop, a desktop machine, a portable gaming device, a device with Internet connectivity, among others), a user, a marketplace 503, a content provider 204, and content 514. The operating environment 500 is configured to deliver data (e.g., content 514, which can include sets of instructions corresponding to different games or display mode configurations) to the user device 120 based upon a request from the user device 120 (e.g., typically initiated by a user of the user device 120). However, it may be appreciated that the delivery of data to the user device 120 can be pushed to the user device 120 and further approved (e.g. acceptance of license agreement, among others) by the user. The data delivered can be from a content provider 504, wherein the data can be delivered directly to the user device 120 or indirectly delivered to the user device 120 via the marketplace 503 and/or the marketplace applications 533. In an embodiment, the user device 120 can utilize a transaction system 515 that facilitates purchasing data via at least one of the marketplace 503, the marketplace applications 533, the content provider 504, and the like. The transaction system 515 can be configured to utilize a charging gateway to facilitate completing a transaction between entities (e.g., user, content provider, marketplace, among others).

The user device 120 and the marketplace 503 can be configured to communicate across a network, for example, wherein the marketplace 503 is accessed via the marketplace application 533 or a user interface (UI) associated with one of the marketplace 503 or the marketplace host 513. The marketplace 503 can be hosted by a marketplace host 513 associated with any suitable host, server, computer, data store, and the like.

In one embodiment, the user device 120 is mobile so that it may function for a period of time without requiring a physical connection to a power source or network provider. For example, a cellular network or a Wi-Fi connection can be used by the user device 120 in order to transmit and/or receive data within the operating environment 500.

A user can employ the user device 120 for the device's intended functions as well as communicating data with the marketplace 503 and/or marketplace host 513. Commonly, the user purchases content 514 and/or products from the content provider 504 via the transaction system 515. It is to be appreciated that the marketplace 503 can be in an electronic form such as a website, the marketplace application 533, or an executable program. In a preferred embodiment, the marketplace 503 takes the form of the marketplace application 533 configured to run on the user's user device 120. The marketplace application 533 may be utilized to install the content 214 from the content provider 504 onto the user device 120.

The marketplace 503 can further connect the content provider 504 and/or the content 514 of the content provider 504 with the user device 120 to allow the user to receive content 514 via a download (e.g., communication of data packets). The marketplace 503 can offer the user a variety of content 514 for purchase (via the transaction system 515) or for free of charge. The content 514 offered by the marketplace 503 may also come from the marketplace host 513. For example, the content provider 504 can have a website for direct delivery of content 514 or have content 514 hosted in the marketplace 503 by the marketplace host 513. Thus, in such an example, a user can directly receive data or content from the website of the content provider 504 or use the marketplace application 533 to identify the content 514 for receipt through the marketplace 503.

In some embodiments, the system 500 utilizes the transaction system 515. The transaction system 515 can include a transaction gateway that facilitates transactions between at least the marketplace host 513, one or more users, the marketplace 503, and/or the content provider 504. When the user purchases content 514 from the marketplace 503 or content provider 504, a charging gateway can receive a request to apply a charge to a user account (e.g., a monetary value via an electronic transaction via an account) owned or authorized by the user. For example, the user account can be, but is not limited to being, a credit card account, an account with the content provider 504 or marketplace host 513, a bank account, a debit account, an e-commerce account (e.g. Pay-Pale), an electronic account, a savings account, and the like.

The transaction gateway can store transaction data (e.g., user account, username, password, data related to the user, data related to the computing device 201, among others) specific to a transaction to receive content 514. The transaction gateway can further collect and/or store data regarding one or more users, wherein the data can be, but is not limited to, credit card numbers, to make it easier for the one or more users to engage in multiple transactions (e.g., simultaneously and/or various points in time). The transaction gateway can further reverse a transaction between one or more parties involved, such as providing a refund to the user.

It is to be appreciated that a purchase may not require the transfer of finances. For example, the content 514 on the marketplace 503 could be free to download. Additionally, a portion of the transaction system 515 can be integrated into at least one of the content provider 504, the marketplace host 513, the marketplace application 533, or a combination thereof. In another embodiment, the first content 514 can be free but additional content related to the first content 514 can require a purchase.

The content provider 504 can create content 514 (e.g., also referred to as products, software, apps, applications, and the like) that can be sold on the marketplace 503. By way of example and not limitation, the content provider 504 can be a videogame company that creates a game specifically tailored to the electronic gaming console 100 to be made available for download from the marketplace 503 by the user device 120. It is to be appreciated and understood that the content provider 504 is not limited to this example and the content provider 504 can be any suitable entity (e.g., user, company, business, group of users, and the like) that creates or develops content 514 to be distributed to the marketplace host 513 for download via the marketplace 503.

In an exemplary embodiment, a user accesses the marketplace 503 via the marketplace application 533 located on the user device 120. The user device 120 can have access to the network, and the user device 120 can communicate data in the form of a query to the marketplace host 513, wherein the data can be a request for information on content 514. The marketplace host 513 can communicate data in the form of a query result (which can include content 514) via a network to the computing device 201 for review, install, use, storage, and the like. In a non-limiting embodiment, the user device 120 can include a user-interface that displays the data (e.g., the query, the query result, the content 514, among others) for the user.

Prior to download of content 514, the user can further navigate information regarding the content 514 that is displayed and select to either request additional content 514 or to purchase the content 514. If the user selects to purchase content 514, the marketplace application 533 communicates a purchase request to the marketplace host 513. The marketplace host 513 can then use the transaction system 515 which includes the transaction gateway charging the user account if data related to the user account is available, and if the user account is not available, then the marketplace host 513 can request user account information from the user which can then be sent to the transaction gateway. Upon receipt of the user account information, the transaction gateway can charge the user account, and send a confirmation of the transaction back to the marketplace host 513.

The marketplace host 513 can then communicate the confirmation information to the user device 120, as well as enable the user to download data for the content 514 and/or the marketplace application 533 stored in a host server regarding the specific content 514 and/or marketplace application 533 purchased. The marketplace application 533 can further assist with installation or transfer of the content 514 or marketplace application 533 purchased onto the user device 120. It is to be appreciated and understood that the above process can occur in any order, such as a downloading of application information from the marketplace host 513 prior to the transaction and the order of the above described process is not to be limiting on the subject innovation.

Once the content 514 (e.g. set of instructions representing a game or display configuration) is transferred to the user device 120, a user may transmit the content 514 to the electronic gaming console 100, which receives the content 514 via the communication interface 118.

Alternatively, the user device 120 may include a development environment that allows a user to create new sets of instructions that can be executed by the electronic gaming console. After a user creates a set of instructions, the user may transmit the set of instructions to the electronic gaming console 100, which receives the content 514 via the communication interface 118. In addition, the user may also provide the set of instructions to be available to others via the marketplace 503.

Figure 6:
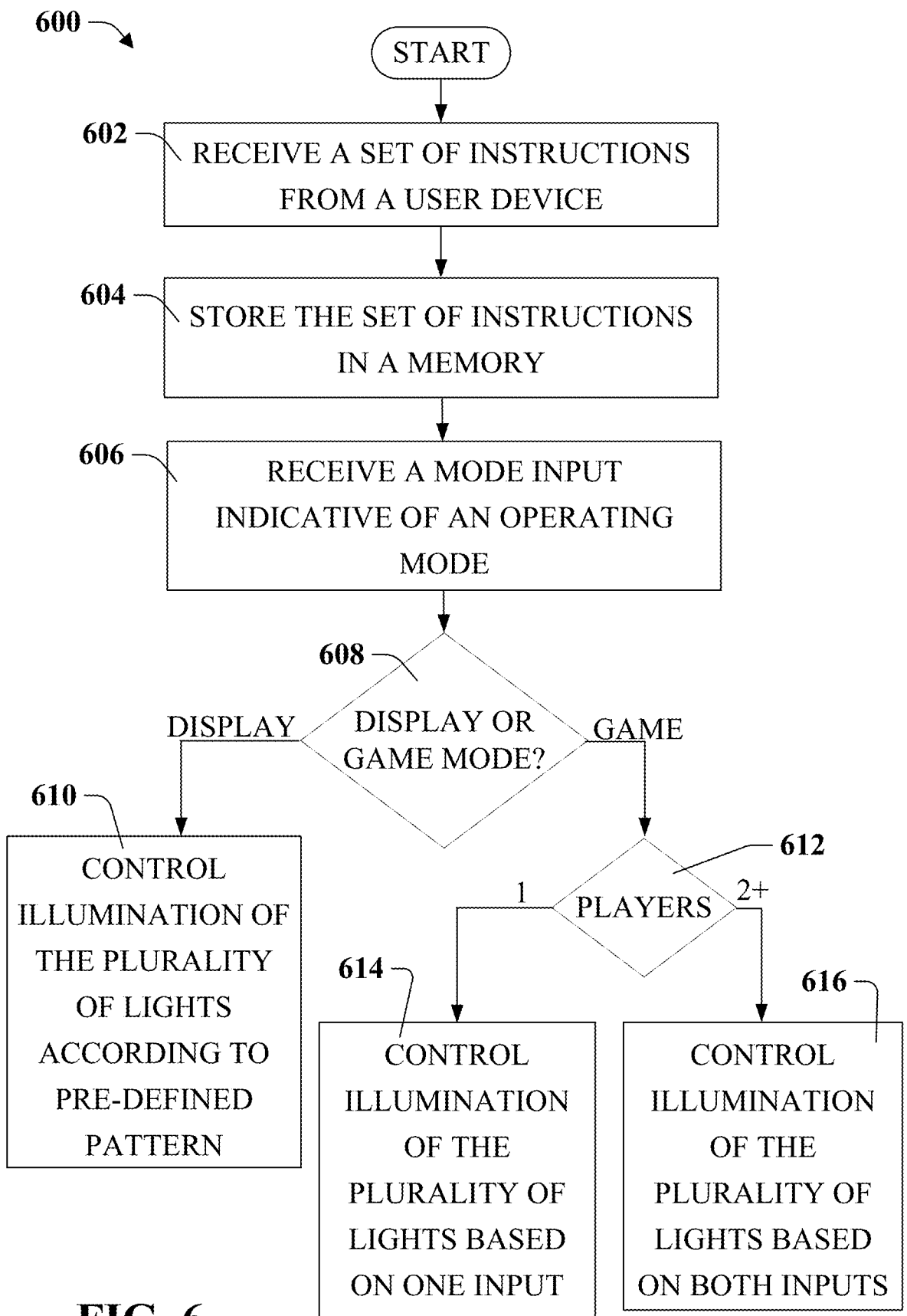
FIG. 6 is a flow diagram depicting the operation of an exemplary electronic console.

Turning now to FIG. 6, an exemplary method 600 is depicted. At reference numeral 602, the electronic gaming console 100 receives a set of instructions from a user device 120. The set of instructions can be, for example, a computer program for a game that is executable by the electronic gaming console 100. The electronic gaming console 100 can receive the set of instructions from the user device 120 through a wired connection (e.g. USB) or a wireless connection (e.g. Bluetooth or WiFi). At reference numeral 604, the set of instructions is stored in a memory 116. At reference numeral 606, the electronic gaming console 100 can receive a mode input indicative of an operating mode. In certain embodiments, the mode input can be received by a user input via one of the first button 104 or the second button 108, or by voice command via the microphone 126. In other embodiments, the mode input can be received automatically as part of the set of instructions. The mode input can indicate, for example, if the electronic gaming console 100 is to operate in a display mode or a game mode. At reference numeral 608, the controller 114 determines whether the mode input indicates a display mode or a game mode.

If the mode input indicates a display mode, the method 600 proceeds to reference numeral 610, where the controller 114 controls illumination of the plurality of lights 112 according to a pattern. The pattern can be defined within the set of instructions, and can indicate parameters such as which particular lights of the plurality of lights 112 should be illuminate at which times, what colors of lights of the plurality of lights 112 should be illuminated at which times, and a brightness of particular lights of the plurality of lights 112. The pattern can create a visual effect using the plurality of lights 112 to provide decoration and/or ambience to a surrounding environment. In certain embodiments, a user can modify the pattern using the user device 120 by sending specific commands to the electronic gaming console 100 or by adjusting settings.

If the mode input indicates a game mode, the method 600 proceeds to reference numeral 612, where the controller 114 determines whether the set of instructions pertains to a single player game or a two-player game. If the controller 114 determines that the set of instructions pertains to a single player game, at reference numeral 614, the controller 114 controls illumination of the plurality of lights 112 based on only one of a first input received from the first control device 102 or a second input received from the second control device 106. If the controller 114 determines that the set of instructions pertains to a two-player game, at reference numeral 616, the controller 114 controls illumination of the plurality of lights based on both the first input from the first control device 102 and the second input from the second control device 106.

Figure 7:
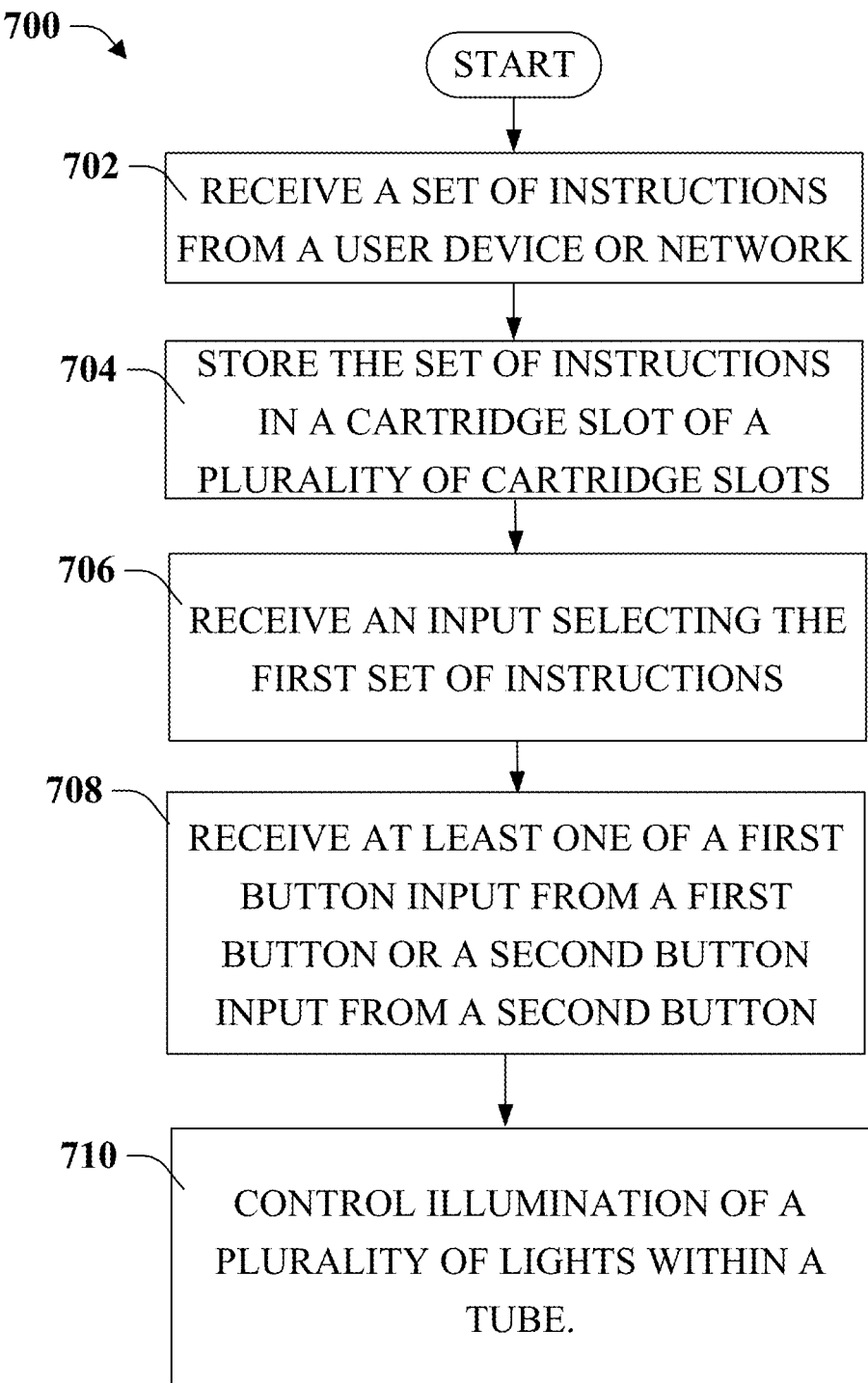
FIG. 7 is a flow diagram depicting the operation of an exemplary electronic console.

Turning now to FIG. 7, an exemplary method 700 is depicted. At reference numeral 702, the electronic gaming console 100 receives a first set of instructions from a user device 120. The first set of instructions can be, for example, a computer program for a game that is executable by the electronic gaming console 100. The electronic gaming console 100 can receive the set of instructions from the user device 120 through a wired connection (e.g. USB) or a wireless connection (e.g. Bluetooth or WiFi). At reference numeral 704, the first set of instructions is stored in a first cartridge slot 304 of a plurality of cartridge slots 302 that are located in the memory 116. At reference numeral 706, the electronic gaming console 100 can receive an input that selects the first set of instructions. In certain embodiments, the input can be received by a user input via one of the first control device 102 or the second control device 106, or by voice command via a microphone 126. At reference numeral 708, the electronic gaming console 100 receives at least one of a first button input from a first button (e.g. first button 204a, second button 204b, or third button 204c on a first control device 102) or a second button input from a second button (e.g. first button 204a, second button 204b, or third button 204c on a second control device 106). At reference numeral 710, the controller 114 controls illumination of a plurality of lights 112 within a tube that connects a first control device and a second control device, based on the first set of instructions, and at least one of the first button input or the second button input.

The above examples are merely illustrative of several possible embodiments of various aspects of the present invention, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (e.g., that is functionally equivalent), even though not structurally equivalent to the disclosed structure which performs the function in the illustrated implementations of the invention. In addition although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising."

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that are not different from the literal language of the claims, or if they include equivalent structural elements with insubstantial differences from the literal language of the claims.

The best mode for carrying out the invention has been described for purposes of illustrating the best mode known to the applicant at the time. The examples are illustrative only and not meant to limit the invention, as measured by the scope and merit of the claims. The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:

1. An electronic gaming console, comprising:
    a first control device including a first button;
    a second control device including a second button;
    a tube connecting the first control device to the second control device, the tube comprising a plurality of lights within an interior of the tube;
    a memory comprising a plurality of cartridge slots; and
    a controller configured to:
        receive a first set of instructions from a user device or a network based on a command from the user device;
        store the first set of instructions in a first cartridge slot of the plurality of cartridge slots;
        receive an input selecting the first set of instructions; and
        control illumination of the plurality of lights based at least partially on the first set of instructions.

2. The electronic gaming console of claim 1, wherein the controller is further configured to receive at least one of a first button input from the first button or a second button input from the second button, and control illumination of the plurality of lights based at least partially on at least one of the first button input or the second button input.

3. The electronic gaming console of claim 2, wherein the controller is configured to control illumination of the plurality of lights based on only one of the first button input or the second button input, or both the first button input and the second button input, according to the first set of instructions received from the user device or the network.

4. The electronic gaming console of claim 1, wherein the plurality of lights within the interior of the tube include a plurality of sections of lights, and each section of lights corresponds to a cartridge slot of the plurality of cartridge slots, and wherein the controller is further configured to, prior to receiving the input selecting the first set of instructions, independently control illumination of each of the plurality of sections of lights according to a set of instructions stored in each section of light's corresponding cartridge slot.

5. The electronic gaming console of claim 1, wherein the first control device is removably coupled to a first end of the tube, and the second control device is removably coupled to a second end of the tube.

6. The electronic gaming console of claim 1, wherein the first set of instructions defines a visual pattern.

7. The electronic gaming console of claim 6, further comprising a microphone, wherein the controller is configured to modify the visual pattern based on a sound input received by the microphone.

8. The electronic gaming console of claim 6, wherein the visual pattern is defined by a mathematical equation, and is modified by at least one of a sound input, a motion input, or a button input.

9. The electronic gaming console of claim 1, wherein the controller is configured to control illumination of the plurality of lights based on the first set of instructions by controlling both a color and a brightness of each individual light of the plurality of lights.

10. The electronic gaming console of claim 1, further comprising:
    one or more sensors,
    wherein the controller is further configured to:
        receive one or more sensor inputs from the one or more sensors; and
        further control illumination of the plurality of lights based on the one or more sensor inputs.

11. The electronic gaming console of claim 10, wherein the one or more sensors comprise an accelerometer located in at least one of the first control device or the second control device.

12. The electronic gaming console of claim 1, wherein the plurality of lights extend along a single dimension.

13. A method of operating an electronic gaming console, comprising:
    receiving a first set of instructions from a user device or a network based on a command from the user device;
    storing the first set of instructions in a first cartridge slot of a plurality of cartridge slots;
    receiving an input that selects the first set of instructions;
    receiving at least one of a first button input from a first button or a second button input from a second button; and
    controlling illumination of a plurality of lights within a tube that connects a first control device and a second control device, based on the first set of instructions, and at least one of the first button input or the second button input.

14. The method of claim 13, further comprising:
prior to receiving the input selecting the first set of instructions, independently controlling illumination of each of a plurality of sections of lights that make up the plurality of lights, according to a set of instructions stored in a corresponding cartridge slot of the plurality of cartridge slots, wherein each section of lights corresponds to a cartridge slot of the plurality of cartridge slots.

15. The method of claim 13, further comprising:
receiving a second set of instructions from the user device or the network based on a second command from the user device; and
storing the second set of instructions in a second cartridge slot of the plurality of cartridge slots.

16. The method of claim 13, wherein the first set of instructions defines a visual pattern.

17. The method of claim 16, further comprising:
modifying the visual pattern based on a sound input received by a microphone.

18. The method of claim 16, wherein the visual pattern is defined by a mathematical equation, and is further modified by at least one of a sound input, a motion input, or a button input.

19. The method of claim 13, further comprising:
controlling illumination of the plurality of lights based on the first set of instructions by controlling both a color and a brightness of each individual light of the plurality of lights.

20. An electronic gaming console, comprising:
a first control device including a first button;
a second control device including a second button;
a tube connecting the first control device to the second control device, the tube comprising a plurality of lights within an interior of the tube that extend in a single dimension, wherein the plurality of lights comprises a first section of lights and a second section of lights;
a memory comprising a plurality of cartridge slots; and
a controller configured to:
receive a first set of instructions from a user device or a network based on a command from the user device;
store the first set of instructions in a first cartridge slot of the plurality of cartridge slots;
receive a second set of instructions from the user device or the network based on a second command from the user device;
store the second set of instructions in a second cartridge slot of the plurality of cartridge slots;
control illumination of the first section of lights based on the first set of instructions;
control illumination of the second section of lights based on the second set of instructions;
receive an input selecting one of the first set of instructions or the second set of instructions; and
control illumination of the plurality of lights, including at least the first section of lights and the second section of lights, based on the first set of instructions or the second set of instructions according to the input.

* * * * *